United States Patent [19]
Brach

[11] 3,813,182
[45] May 28, 1974

[54] DEVICE FOR HOLDING CHUCK KEY AND FOR DRILLING STRAIGHT AND PERPENDICULAR HOLES

[75] Inventor: Walter H. Brach, Somerville, N.J.

[73] Assignee: The Raymond Lee Organization, Inc., New York, N.Y. ; a part interest

[22] Filed: Aug. 18, 1972

[21] Appl. No.: 281,829

[52] U.S. Cl.............................. 408/72, 81/177 D
[51] Int. Cl........................................... B23b 49/00
[58] Field of Search..... 408/72; 145/129; 81/177 A, 81/177 D, 184, 177 R

[56] References Cited
UNITED STATES PATENTS
2,475,268  7/1949  Wittle........................ 81/177 D X FOREIGN PATENTS OR APPLICATIONS
819,589  9/1959  Great Britain....................... 408/72
660,409  4/1963  Canada.............................. 408/72

Primary Examiner—Andrew R. Juhasz
Assistant Examiner—Z. R. Bilinsky

[57] ABSTRACT

A device for supporting a drill chuck key and for use in enabling straight and perpendicular holes to be drilled with a portable electric drill powered bit comprising a rectangular flat member provided with a socket for supporting the key, the member having one flat edge and three other edges which are either perpendicular or parallel to the flat edge, each other edge having a longitudinal groove in cross section defining a V.

1 Claim, 4 Drawing Figures

PATENTED MAY 28 1974 3,813,182
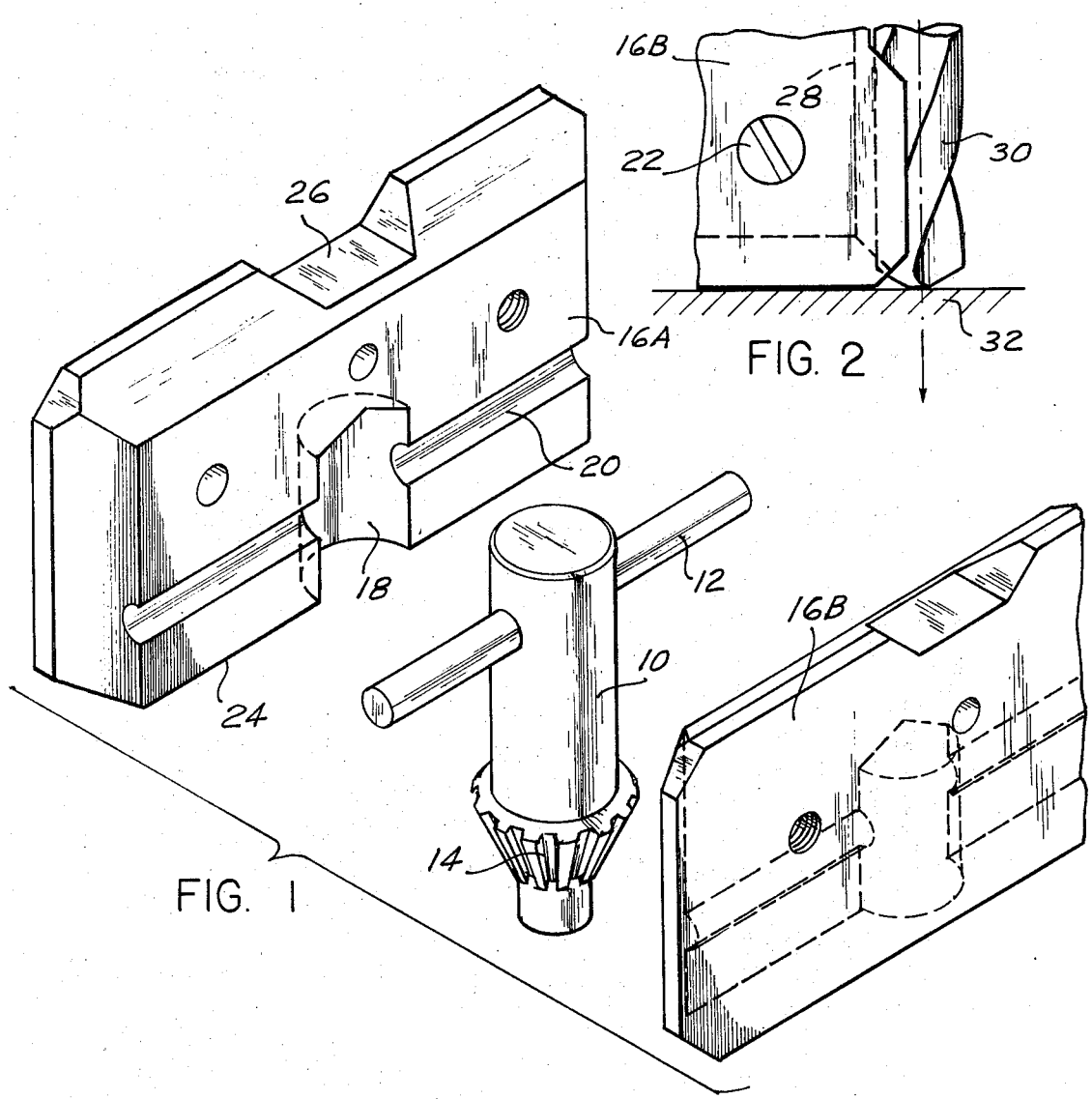
FIG. 2
FIG. 1
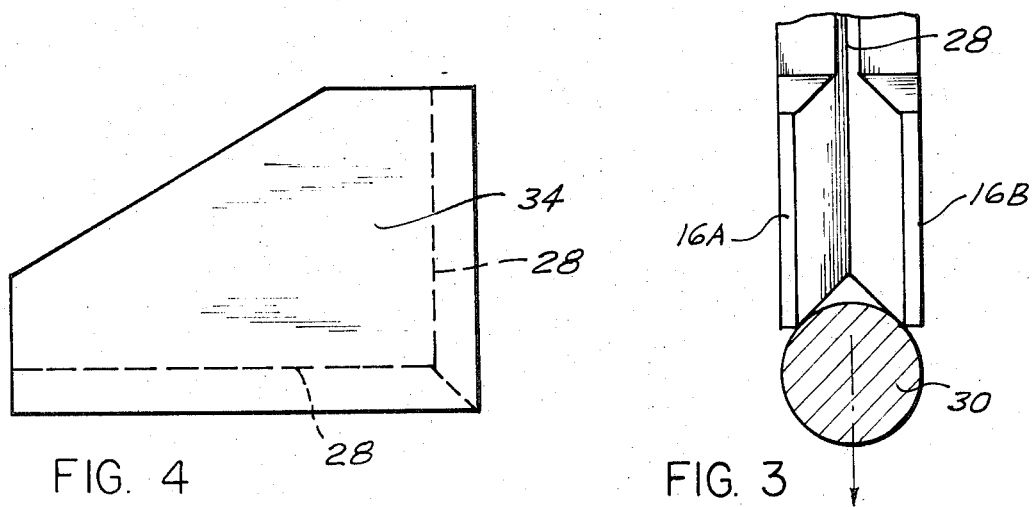
FIG. 4
FIG. 3

DEVICE FOR HOLDING CHUCK KEY AND FOR DRILLING STRAIGHT AND PERPENDICULAR HOLES

FIELD OF THE INVENTION

It is often necessary to drill straight holes into a flat or round workpiece in such manner that the holes are perpendicular to the workpiece. This is easily accomplished with suitably mounted tools, but is very difficult to accomplish using a drill bit mounted in a portable electric drill.

My invention permits anyone using a portable electric drill to drill straight and perpendicular holes into a flat or round workpiece and at the same time to retain the chuck key for the drill, and prevent its loss.

SUMMARY

To this end, I employ a flat member having a rectangular shape and provided with means for supporting the chuck key in position for use. The member has one flat edge and three other edges which are either perpendicular or parallel to the flat edge. Each of these other three edges has a longitudinal groove, each groove in cross section defining a V.

In use the member is held against the work piece with one of the groove carving edges extending at right angles to the piece. Any size drill bit is disposed longitudinally in the groove and the drill is operated. As long as the user holds the bit in the groove, the hole will be straight and perpendicular to the piece.

BRIEF DESCRIPTION OF THE DRAWINGS

In the drawings:

FIG. 1 is a perspective of my invention;

FIG. 2 is a detail elevation showing the invention in use;

FIG. 3 is another elevation of the arrangement of FIG. 2; and

FIG. 4 is an elevation of a modification of my invention.

DETAILED DESCRIPTION OF PREFERRED EMBODIMENTS

Referring now to FIGS. 1–4, a chuck key has a main body 10, a cross arm 12 and a chuck engaging tip 14. The support comprises a flat rectangular member defined by two mating sections 16A and 16B which are identical in shape. Each section has an inner cavity with a recess 18 for body 10 and recess 20 for arm 12. When the sections are joined together by screws 22 or other means, the chuck body and arm will be fitted into the recesses and thus held in place. The member has one flat edge 24 out of which tip 14 extends at right angles. Thus the member can be turned and manipulated to allow the key to be used with the drill chuck.

The member has three other sides, one side 26 being parallel to edge 24, the other two sides being opposed, parallel to each other and perpendicular to edge 24. Each of these three other sides has a longitudinal groove 28 which in cross section defines a V.

A drill bit 30 can be disposed longitudinally in any groove and the member held against a workpiece 32 in such manner that the bit is perpendicular to the workpiece whereby the invention can be used as previously described.

FIG. 4 is not to be molded or cast around a chuck key. FIG. 4 is a separate device, to be used by itself (without a chuck key) for drilling perpendicular holes.

Instead of making FIG. 1 a two piece construction, FIG. 1 can also be made by combining items 16A and 16B into one piece and molding or casting directly over the chuck key.

While I have described my invention with particular reference to the drawings, such is not to be considered as limiting its actual scope.

I claim:

1. A device for supporting a drill chuck key and at the same time adapted for use in enabling straight and perpendicular holes to be drilled into flat or round work with a portable electric drill powered bit, said device comprising:
   a flat member consisting of two mating half sections identical in size and shape and each member having one flat edge, three other edges, two of which edges are perpendicular to said flat edge and the third edge is parallel to said flat edge, each of said three edges being beveled;
   each half section having a mating inner cavity with a vertical recess for receiving the chuck key body and a horizontal recess for the arms thereof;
   said mating halves being secured together by screws with said bevel edges forming V- groove guides on three sides and said cavities in register forming drill chuck key holding means.

* * * * *